United States Patent
Sriram et al.

(10) Patent No.: US 6,169,738 B1
(45) Date of Patent: Jan. 2, 2001

(54) METHOD FOR CALL ADMISSION IN PACKET VOICE SYSTEM USING STATISTICAL MULTIPLEXING AND DYNAMIC VOICE ENCODING

(75) Inventors: Kotikalapudi Sriram; Yung-Terng Wang, both of Marlboro, NJ (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 08/965,515

(22) Filed: Nov. 6, 1997

(51) Int. Cl.[7] .................................................. H04L 12/28
(52) U.S. Cl. ........................................ 370/395; 370/468
(58) Field of Search ................................. 370/395, 437, 370/431, 412, 229, 468, 352, 235, 252, 253, 230

(56) References Cited

U.S. PATENT DOCUMENTS 4,914,650 * 4/1990 Sriram ..................................... 370/60
5,570,355 * 10/1996 Dail et al. ............................. 370/60.1

FOREIGN PATENT DOCUMENTS 0648035   4/1995  (EP) .............................. H04Q 11/04

OTHER PUBLICATIONS

Mauger, R., et al., "ATM Adaptation Layer Switching", ISS '97, World Telecommunications Congress (International Switching Symposium), Global Network Evolution: Convergence or Collision? Toronto, Sep. 21–26, 1997, vol. 1, Sep. 21, 1997, pp. 207–217 XP000720525.

* cited by examiner

*Primary Examiner*—Jessica J. Harrison
*Assistant Examiner*—Kim T. Nguyen
(74) *Attorney, Agent, or Firm*—J. J. Opalach

(57) ABSTRACT

An AAL2/SSCS packet voice system multiplexes various forms of voice-band traffic including voice packets, fax packets, and data packets into a virtual circuit (VC). This AAL2/SSCS packet voice system executes a dynamic call admission algorithm that takes into account call type in deciding whether to admit a new call to the VC. In particular, this approach takes into account different bandwidth needs for different call types. The AAL2/SSCS packet voice system also performs bit or block dropping on voice packets to mitigate the effects of traffic congestion. The bit or block dropping is done based on the packet queue fill value exceeding at least one queue threshold. Further, the AAL2/SSCS packet voice system also dynamically varies a queue threshold as a function of capacity.

11 Claims, 9 Drawing Sheets

PACKET HEADER (3 OCTETS)

FIG. 5
TRAFFIC TYPES AND BANDWIDTH

| CALL TYPE IDENTIFIER | TRAFFIC TYPES | BANDWIDTH | BANDWIDTH INCLUDING AAL2 OVERHEAD | BANDWIDTH INCLUDING AAL2 AND ATM OVERHEAD |
|---|---|---|---|---|
| 0 | G.727 VOICE WITH SILENCE ELIMINATION | 32 kb/s (PEAK) | 36.8 kb/s (PEAK) 14.7 kb/s (AVERAGE) | 41.5 kb/s (PEAK) 16.6 kb/s (AVERAGE) |
| 1 | <28 kb/s MODEM | 40 kb/s | 44.8 kb/s | 50.5 kb/s |
| 2 | 28.8 kb/s to 56 kb/s MODEM | 64 kb/s | 68.8 kb/s | 77.6 kb/s |
| 3 | G3 FACSIMILE | 9.6 kb/s | 14.4 kb/s | 16.2 kb/s |

- ASSUMING 5 ms AAL2/SSCS PACKETIZATION INTERVAL IN ALL CASES.
- VOICE ACTIVITY = 40 % (AVERAGE TALKSPURT = 400 ms, AND AVERAGE SILENCE = 600 ms).

BLOCK (OR BIT) DROPPING FOR CONGESTION CONTROL
INPUT BLOCK DROPPING: BLOCK-DROPPING AT INPUT OF AAL2 PROCESSOR

FIG. 7 EFFECTIVE BANDWIDTH ($V_n$) AND STATISICAL MULTIPLEXING GAIN

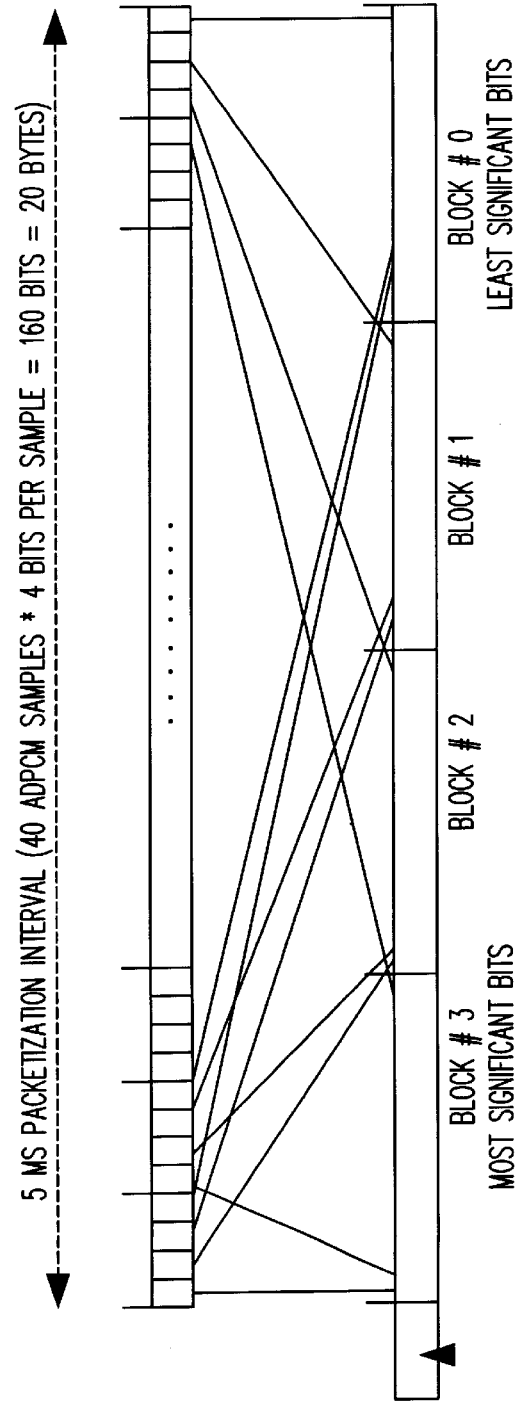

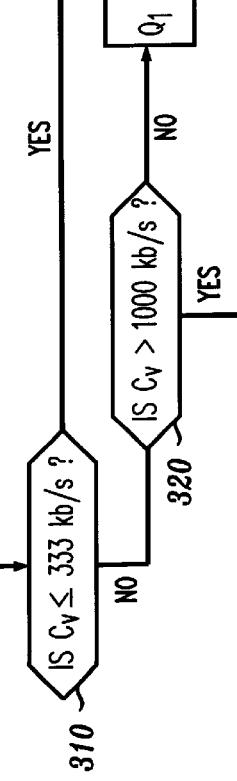
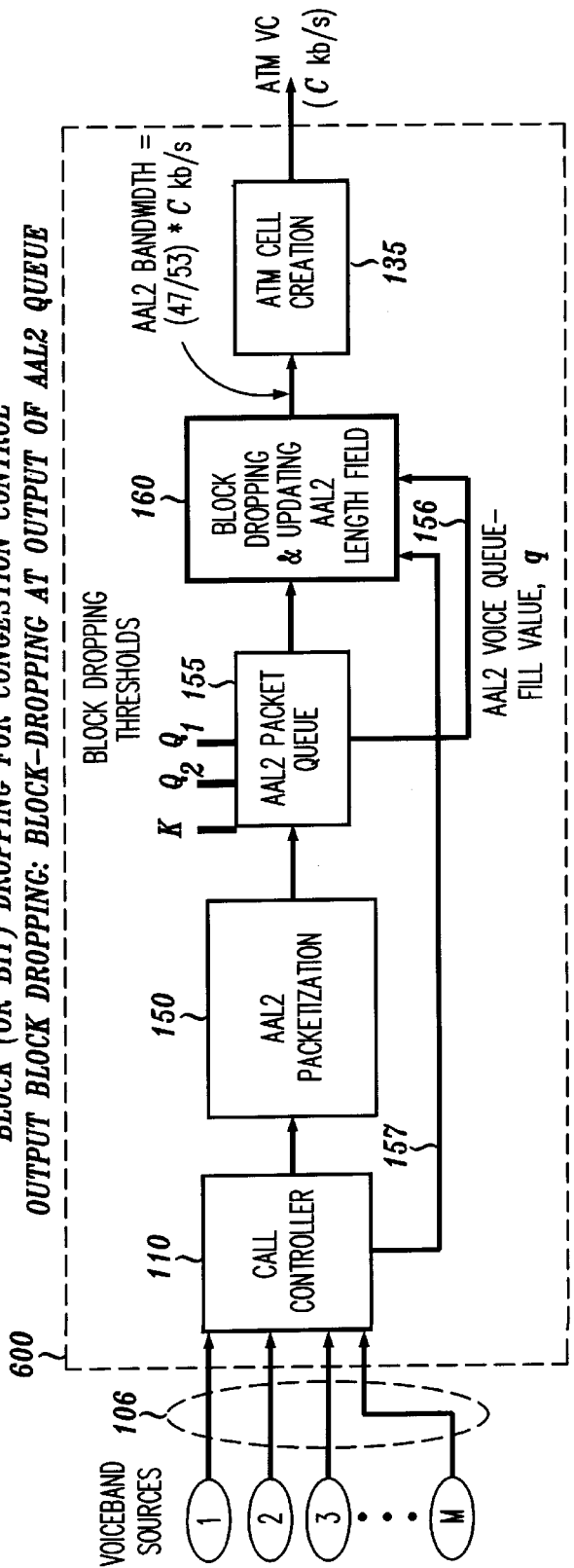
FIG. 12
FIG. 13
BLOCK (OR BIT) DROPPING FOR CONGESTION CONTROL
OUTPUT BLOCK DROPPING: BLOCK-DROPPING AT OUTPUT OF AAL2 QUEUE BLOCK (OR BIT) DROPPING FOR CONGESTION CONTROL
INPUT BLOCK DROPPING: BLOCK-DROPPING AT INPUT OF ATM PROCESSOR

METHOD FOR CALL ADMISSION IN PACKET VOICE SYSTEM USING STATISTICAL MULTIPLEXING AND DYNAMIC VOICE ENCODING

FIELD OF THE INVENTION

This invention relates generally to communications and, more particularly, to a communications system for transporting packet voice.

BACKGROUND OF THE INVENTION

Asynchronous transfer mode (ATM) networks carry fixed sized cells within the network irrespective of the applications being carried over ATM. At the network edge or at the end equipment, an ATM Adaptation Layer (AAL) maps the services offered by the ATM network to the services required by the application. There are a number of industry standards and proposed standards covering various AALs. In particular, "B-ISDN ATM Adaptation Layer Type 2 Specification," draft Recommendation I.363.2, November 1996, of ITU-T (herein referred to as AAL2) provides for efficient ATM transport of small, delay-sensitive packets in such applications as packet voice systems. AAL2 is partitioned into two sublayers, the Common Part Sublayer (CPS) and the Service Specific Convergence Sublayer (SSCS).

In an AAL2/SSCS packet voice system, the peak required raw bandwidth of voice, coded in accordance with ITU-T standard embedded ADPCM G.727 (hereafter referred to as G.727), is 32 thousands of bits per second (kb/s). However, other types of voice-band type traffic are also carried in this system besides voice itself. For example, G3 facsimile (fax) traffic may be conveyed requiring a typical bandwidth of 9.6 kb/s. Also, data traffic may be carried with required bandwidths of as much as 64 kb/s in the case of 56 kb/s modem technology.

As a result, an AAL2/SSCS packet voice system multiplexes a variety of traffic types onto an outgoing ATM virtual circuit (VC) pipe, which has a fixed bandwidth allocation in accordance with an ATM service category, e.g., ATM Constant Bit Rate (CBR), ATM Real-Time Variable Bit Rate (rt-VBR). (This bandwidth is typically fixed, or static, and negotiated with a distant ATM endpoint at setup of the VC.) Once the VC is set up, new calls may be admitted to the VC in accordance with a call admission algorithm. In this call admission algorithm, all traffic is treated in a homogeneous fashion in one extreme. A new call is admitted simply by comparing the current number of calls in the respective VC to a predetermined call threshold value. If the current number of calls is less than this call threshold value, then the new call is admitted. Otherwise, the new call is blocked.

Unfortunately, as new calls are admitted to the pipe, traffic loads may necessitate the use of congestion relief algorithms for the voice traffic such as bit dropping or dropping entire AAL2 voice packets. (It is presumed that only voice traffic is throttled to relieve congestion and that non-voice traffic is not targeted for packet dropping in order to provide for congestion relief.) For example, as congestion begins to occur, voice packets are typically queued for transmission in a buffer, or queue. If the number of these queued voice packets exceeds a predetermined threshold, bit dropping for voice traffic begins to occur in accordance with, e.g., G.727. If the congestion continues to worsen, then entire AAL2 voice packets are dropped. (Also, it should be noted that if the above-mentioned thresholds are too small, bit dropping occurs too soon, and if the above-mentioned thresholds are too large, bit dropping occurs too late. In this latter case, there is almost little, or no, benefit from bit dropping (in the context of G.727) because of the already incurred large packet delay by the time bit dropping begins to start.)

SUMMARY OF THE INVENTION

In view of the above, we have observed that a call admission control strategy that treats all calls in a homogenous fashion either admits too few calls—thus causing some calls to be blocked even though capacity exists—or too many calls—with concomitant congestion effects. As such, we have realized that a call admission control strategy should take into account different call types in order to provide for efficient bandwidth management. In particular, and in accordance with the invention, call admission is dynamically performed as a function of call type.

In an illustrative embodiment, an AAL2/SSCS packet voice system multiplexes various forms of voice-band traffic including voice packets, fax packets, and data packets into a virtual circuit (VC). This AAL2/SSCS packet voice system executes a dynamic call admission algorithm that takes into account call type in deciding whether to admit a new call to the VC. In particular, this approach takes into account different bandwidth needs for different call types.

In accordance with a feature of this invention, at least one queue parameter is dynamically varied as a function of capacity (or link bandwidth). An example of a queue parameter is a threshold.

BRIEF DESCRIPTION OF THE DRAWING

FIG. 5 shows an illustrative table listing call types and bandwidths;

FIG. 10 shows an illustrative organization of an AAL2 voice packet;

FIG. 11 shows a congestion state table;

FIG. 12 shows a flow chart for dynamically varying block dropping thresholds in accordance with the principles of the invention;

FIG. 13 shows another embodiment of a packet communications system embodying the principles of the invention.

DETAILED DESCRIPTION

Figure 1:
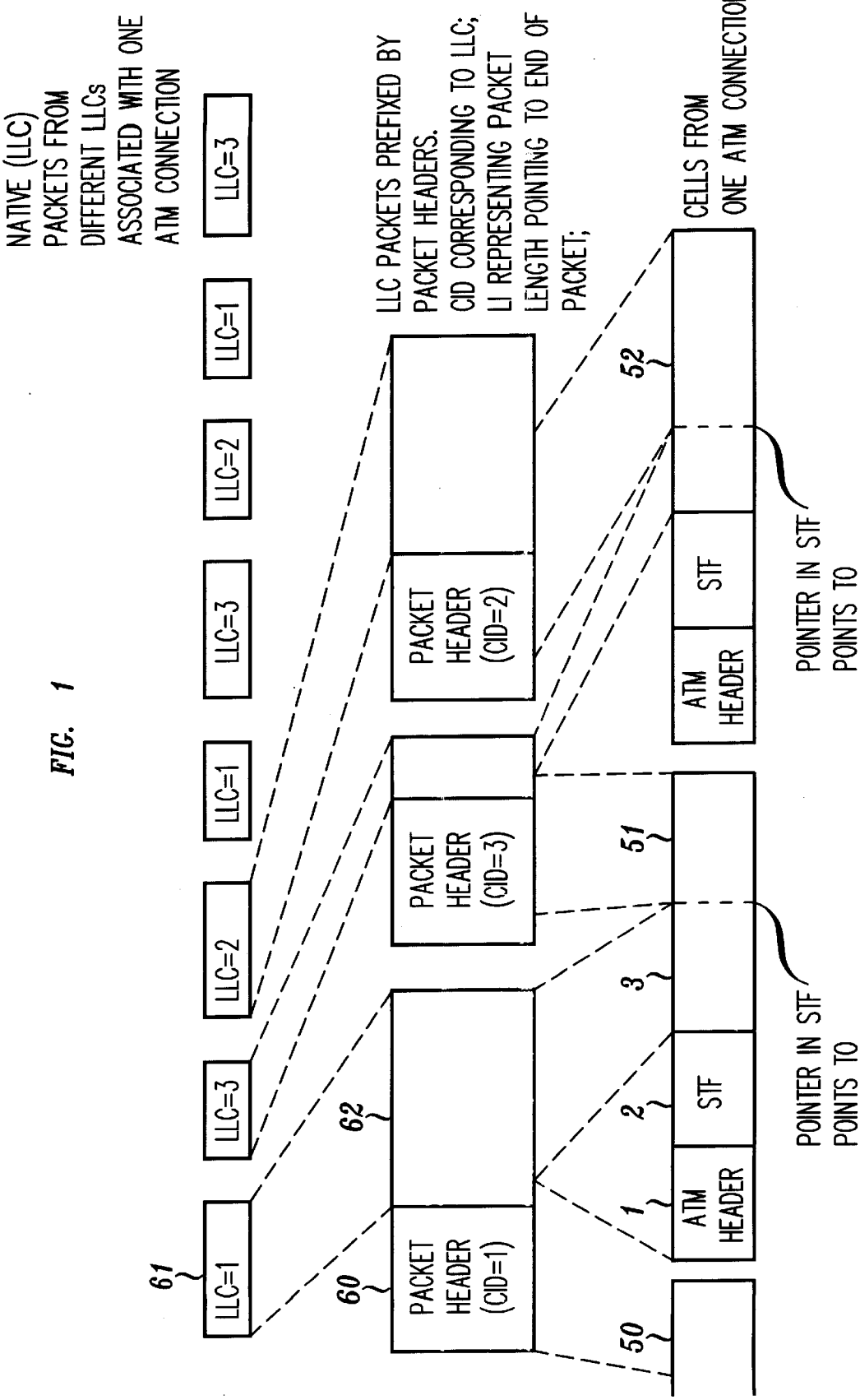
FIG. 1 shows illustrative ATM cells and AAL2 formatting.

Before describing an illustrative embodiment of the invention, some background information on ATM Adaptation Layers (AALs) and, more particularly, AAL2, is provided.

AAL2

ATM networks carry fixed size (53 octets) cells within the network irrespective of the applications being carried over ATM. To support applications in native protocol mode, a Terminal Adapter (TA) at the network edge acts as an 'ATM user' and implements an ATM Adaptation Layer (AAL) to map the services offered by the ATM network to the services required by the application. In cases where ATM is terminated at the end user equipment, the AAL entity is implemented there. AAL-1 has been defined for Constant Bit Rate (CBR) traffic requiring tight delay and jitter control (e.g., see ITU-T Recommendation I.363.1 B-ISDN ATM Adaptation Layer AAL-1 Specification). Also AAL-3/4 (e.g., see ITU-T Recommendation I.363.3/4 B-ISDN ATM Adaptation Layer AAL 3/4 Specification) and AAL-5 (e.g., see ITU-T Recommendation I.363.5 B-ISDN ATM Adaptation Layer AAL-5 Specification) have been defined for bursty data. These AALs allow simple encapsulation of application 'packets' if each packet fits into one ATM cell. For larger application packets, a segmentation and reassembly (SAR) layer allows segmentation of a 'packet' at the transmitter, so each segment fits into an ATM cell, and reassembly of the original packet from the received ATM cells at the receiver. These AALs thus allow collection of enough information to fit into one ATM cell payload or segmentation of larger native mode packets into smaller units such that each smaller unit fits into an ATM cell payload. If native information units are smaller than an ATM payload, these AALs require partial fill of ATM cells.

However, many applications require ATM transport of 'small packets' that are smaller than the ATM cell size. Some of these applications are: PBX-to-PBX trunking for compressed voice with or without silence suppression; ATM backbone for cellular/PCS wireless access; ATM trunking between circuit switches; and ATM backbone connectivity to packet telephony.

In applications like the ones mentioned above, there are two primary reasons to transmit small packets across ATM networks: (i) when small native packets are generated away from the ATM network and the packet boundaries need to be recovered at the destination outside ATM network; and (ii) when the bit rate of a native application is low and the requirement on the end-to-end delay prohibits accumulation of bits to fill an ATM cell before sending the cell out to its destination. In the latter case, small packets are generated even if the packetization is done at the ATM network edge. Use of an ATM network to connect base stations to vocoder groups in digital cellular systems is an example of the former. ATM trunking between circuit switches or circuit PBXs is an example of the latter.

For these applications, partial fill of ATM cells resulting from use of AAL-1, AAL-3/4, or AAL-5, may cause unacceptable loss in bandwidth efficiency. This inefficiency is of concern due to high cost/bps (bits per second) when the total traffic demand needs only low speed leased lines. In many cases, this cost penalty may nullify many of the advantages offered by an ATM backbone. This necessitates use of an AAL for small packets such as AAL2. The latter provides efficient transport of small native packets over ATM networks in such a way that allows very small transfer delay across the ATM network and still allows the receiver to recover the original packets.

AAL2 treats the payloads from successive ATM cells from the same ATM connection as a byte stream in which variable length Logical Link Connection (LLC) packets are multiplexed. Each LLC packet stream originates from one end user connection such as a voice, facsimile, or voice-band data (VBD) call. An illustration of ATM cells and AAL2 formatting is shown in FIG. 1. An ATM connection comprises a plurality of ATM cells, a portion of which is represented by the sequence of ATM cells 50, 51, and 52. Each ATM cell comprises an ATM header 1 (as known in the art), an STF field 2 and a plurality of LLC packets 3 (defined below). Each LLC packet, as represented by LLC packet 60 comprises a packet header 61 and a native LLC packet 62.

Figure 2:
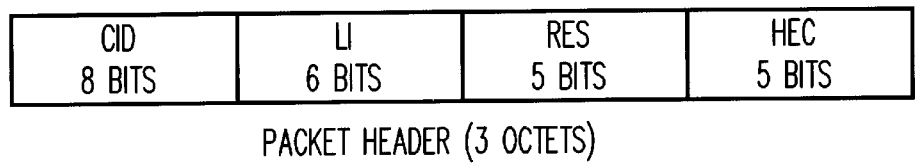
FIG. 2 shows a packet header of an LLC packet in accordance with AAL2.

The packet header is 3 octets long and is shown in detail in FIG. 2. The packet header comprises four fields: a Channel ID (CID) field, a Length Indicator (LI) field, a Reserved (RES) field, and a Header Error Check (HEC) field.

The CID field is 8 bits long and identifies the LLC to which the packet belongs. (Referring briefly back to FIG. 1, it can be observed that the CID field value for the associated LLC packet corresponds to the LLC number.) The CID field provides support for a maximum of 255 native connections (LLCs) over a single ATM VC. As known in the art, an ATM cell header allows two levels of addressing: a Virtual Path Identifier (VPI) and Virtual Connection Identifier (VCI). A Virtual Path Connection (VPC) can have a number of VCs. With a 16 bit VCI field, an ATM VPC can support up to $255 \times 2^{16}$ LLCs.

The LI field is 6 bits and indicates the length of the LLC packet (or native packet). The LI field is added to each LLC packet so that the end of variable length packets can be demarcated. The LI field allows specification of up to 63 octets. When the value of the LI field points beyond the end of the current ATM cell, the packet is split between cells (this is also illustrated in FIG. 1, where LLC packet 60 is split between ATM cells 50 and 51).

Since the primary driver for AAL2 is packet telephony, and error detection is not essential for voice coding algorithms, error detection for native packets is not necessary. The purpose of error detection is to guarantee that CID, LI and other critical protocol header fields do not get misinterpreted. This is accomplished in AAL2 by the HEC field in each packet header. The HEC field is 5 bits (see FIG. 2) and provides error detection over the packet header. This has the advantage of being able to discard only those packets whose headers are corrupted.

AAL2 is partitioned into two sublayers, the Common Part Sublayer (CPS) and the Service Specific Convergence Sublayer (SSCS). The RES field comprises five bits, which are reserved or assigned to either the CPS or a Service Specific Convergence Function (SSCF) of the SSCS. The CPS provides the functions of multiplexing variable length packets from multiple sources into a single ATM virtual circuit and relaying these packets to form end-to-end AAL2 connections. That portion (not shown) of the RES field assigned to the CPS are used to provide signaling such as a "More" bit to indicate that the current packet is segmented, signaling, or user information. The remaining portion (not shown) of the RES field assigned to the SSCF provides an application specific function, a different instance of being provided to each AAL2 user. Examples of such functions are segmentation and reassembly of user flows into packets suitable for the common part, forward error control, identifying the voice coding algorithm, identifying the end of a speech burst, packet sequence number, etc. The SSCS can also be null. (At this point, the ITU-T standards body intends to specify SSCS protocols in future recommendations.) These SSCF-oriented bits are not interpreted by the AAL2 CPS and are passed transparently from the transmitting SSCS to the receiving SSCS. The SSCS may use these bits for specific SSCF functions or to pass higher layer user-to-user communication transparently.

Figure 3:
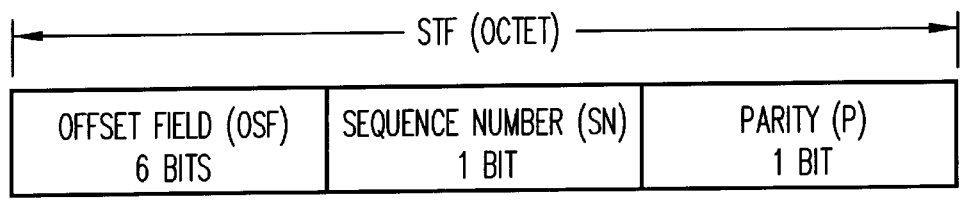
FIG. 3 shows a start field of an ATM cell in accordance with AAL2.

As can be observed from FIG. 1, a Start Field (STF) is present at the beginning of each ATM cell payload from a given ATM connection. The format of the STF field is shown in FIG. 3. An STF field is 1 octet in length and comprises an Offset field (OSF), a Sequence Number (SN) field and a Parity (P) field.

While the LI field in each LLC packet allows self delineation once a packet boundary is identified, a cell loss or an error in a packet header results in the loss of packet delineation. In order to regain packet boundaries, the OSF field specifies the beginning of the first new packet in the current ATM cell payload. The OSF field is 6 bits in length and indicates the remaining length of the packet that (possibly) started in the preceding cell from this ATM connection and is continuing in the current cell. This approach guarantees resynchronization of packet boundaries in one ATM cell time after a delineation loss.

Given that a loss of an ATM cell, if not detected at the receiver, can misconcatenate packets, the SN field also exists. The one bit SN field provides a modulo 2 sequence numbering of cells and immediate detection of a single cell loss. It may be noted that this 1-bit sequence number is different from the earlier-mentioned sequence number which is part of the RES field in the AAL2 packet header.

Finally, like the packet header, the SN field and OSF field also require error detection. This is provided by the single parity bit of the P field, which provides odd parity.

It should be noted that it may be necessary to transmit a partially filled ATM cell in order to limit the packet emission delay. In this case, the remainder of the cell is padded with all-zero octets. A cell whose payload contains only the STF field and 47 padding octets can also be transmitted in order to meet some other needs such as serving a "keep-alive" function, satisfying a traffic contract, etc.

AAL2 creates multiple levels of connections between two points: ATM virtual connections (VCs) and AAL2 Logical Link Connections (LLCs). The AAL2 LLC in this case is defined to be a point-to-point connection, for example, between a base station and the vocoder group in the Mobile Switching Center (MSC) for cellular trunking, or between two PBX's or two switches for land-line trunking. The connection is defined to be bi-directional and the same CID is assumed to be used in both directions for a particular LLC. The set of CIDs available on an ATM VC are known to both ends.

The negotiation procedures are symmetric, that is, either end of the AAL2 connection is permitted to initiate a new LLC or request tear down of an LLC. A simple negotiation procedure is defined where the originating end proposes establishment of a new LLC with the use of a particular CID that is not in use and the other end can accept or deny the request. Bandwidth management and monitoring for the ATM virtual circuit is assumed to be handled at the ATM connection management level. No such monitoring is proposed per LLC. However, it is the responsibility of the two end points to guarantee resource availability within the ATM connection to support a new LLC. Such resource management is assumed to be handled in a service specific manner. Signaling needed for LLC set up and tear down between AAL2 uses a predefined LLC (with CID=0).

Call Admission

Figure 4:
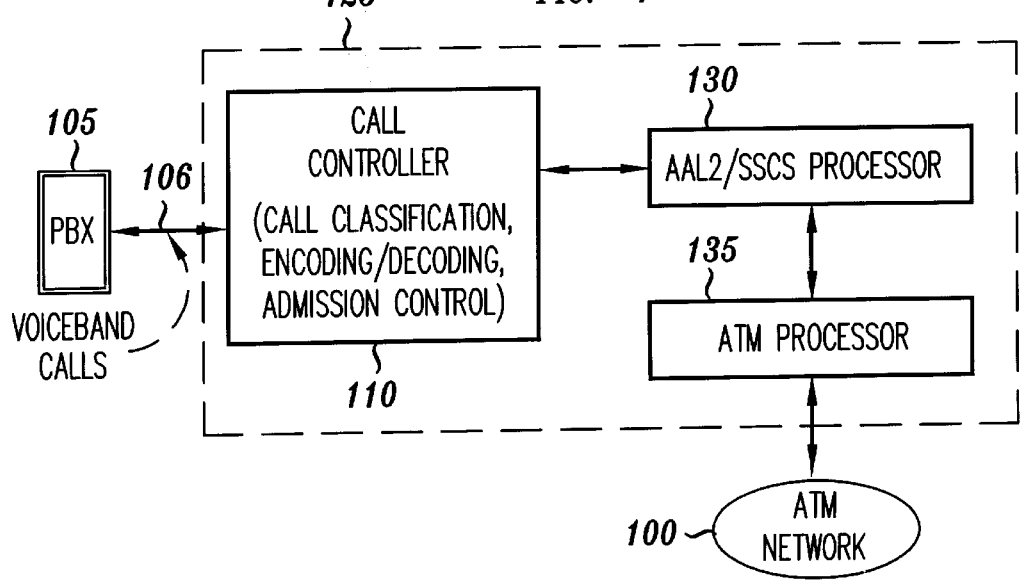
FIG. 4 shows a portion of a packet communications system in accordance with the principles of the invention.

A portion of a packet communications system in accordance with the principles of the invention is shown in FIG. 4. Other than the inventive concept, the elements shown in FIG. 4 are well-known and will not be described in detail. For example, although shown as a single block element, call controller 110, of call processor 125, includes stored-program-control processors, memory, and appropriate interface cards. Other than the inventive concept, call processor 125 implements an AAL2/SSCS voice packet system. (It should also be noted that like numbers in different figures are similar elements.)

PBX 105 transmits and receives a plurality of voice-band calls to call controller 110 of call processor 125, via facility 106. The latter is representative of any number and type of communications facilities. To facilitate the description it is assumed that facility 106 is a DS1 facility (for each direction) as known in the art, which carries a plurality of voice-band calls. As such, it is presumed that for each call there is a 64 kb/s bit stream in either direction over facility 106.

Before describing the inventive concept in detail, a general overview of the operation of call processor 125 is provided. Call processor 125 comprises call controller 110, AAL2/SSCS processor 130 and ATM processor 135. For each call, call controller 110 first classifies the voice-band call. (Call classification techniques are known in the art and will not be described herein. For example, G3 fax calls are identified by detecting predefined fax calling tones, etc.) As noted above, there are a variety of different types of voice-band calls. An illustrative list of some call types is shown in the table of FIG. 5. This table also lists illustrative bandwidths at different points in the call processing (described below). This table assumes a 5 milli-second (ms) AAL2/SSCS packetization interval in all cases. In addition, it is assumed that activity for a voice call is equal to 40% (average talkspurt=400 ms, and average silence=600 ms). Call controller 110 associates a predefined call type with each call. For the purposes of illustration only, this example includes four voice-band call types. A voice call is associated with call type "0," a data call with a data rate of less than 28.8 kb/s is associated with call type "1," a data call with a data rate of 28.8 kb/s to 56 kb/s is associated with call type "2," and a G3 fax call is associated with call type "3." (Additional definitions of other call types could also be used. For example, the characterization of data call types according to speed could be finer, e.g., a call type for each available industry standard modem data rate.)

If call controller 110 detects a voice call, then the voice call is encoded in accordance with G.727. As such, call controller 110 compresses the 64 kb/s bit stream from PBX 105 into a 32 kb/s compressed audio stream using ADPCM as known in the art for application to AAL2/SSCS processor 130. Similarly, in the other direction, call controller 110 decompresses the 32 kb/s ADPCM bit stream provided by AAL2/SSCS processor 130 into a 64 kb/s audio stream for application to PBX 105.

On the other hand, if a non-voice call is detected, call controller 110 provides an encoded data stream at the indicated bandwidths. For example, a 14.4 kb/s Voice Band Data (VBD) call is transmitted using 40 kb/s ADPCM to AAL2/SSCS processor 130, and a 28.8 kb/s or 56 kb/s VBD call is transmitted using 64 kb/s PCM (pulse code modulation).

Turning now to AAL2/SSCS processor 130, it converts received bit streams, from call controller 110, into AAL2 packets for application to ATM processor 135. In this conversion, the SSCS portion of processor 130 performs functions such as silence suppression, assignment of sequence numbers, and background noise level notification. In the opposite direction, AAL2/SSCS processor 130 receives AAL2 packets from ATM processor 135 and depacketizes them. AAL2/SSCS processor 130 provides functions such as buffering (not shown) for build-out delay before playing out packets for transmission to call controller 110; and noise fill during silence period. In playing out the packets, AAL2/SSCS processor 130 makes use of sequence numbers to decide delayed packets and to maintain integrity in the play-out process. The required bandwidth for transmission using AAL2 for the different call types is shown in FIG. 5. (The peak numbers listed for a voice call represents periods of talking, or talk spurts.)

ATM processor 135 provides the following transmit functions: filling payload of ATM cells with AAL2 packets; forming an ATM cell whenever the payload is filled-up or a timer (e.g., 2 milli-seconds (ms)) expires with at least one AAL2 packet in the payload (whichever of the two events happens first); ATM cell header processing; placing ATM cells into a transmit buffer, etc. ATM processor 135 schedules ATM cells for transmission over an ATM VC through an ATM network 100. ATM processor 135 receives ATM cells from ATM network 100 and provides the following receive functions: ATM cell header processing and error control; transferring AAL2 packets to AAL2/SSCS processing unit, etc. The required bandwidth for transmission including AAL2 and ATM overhead for the different call types is shown in FIG. 5.

Figure 6:
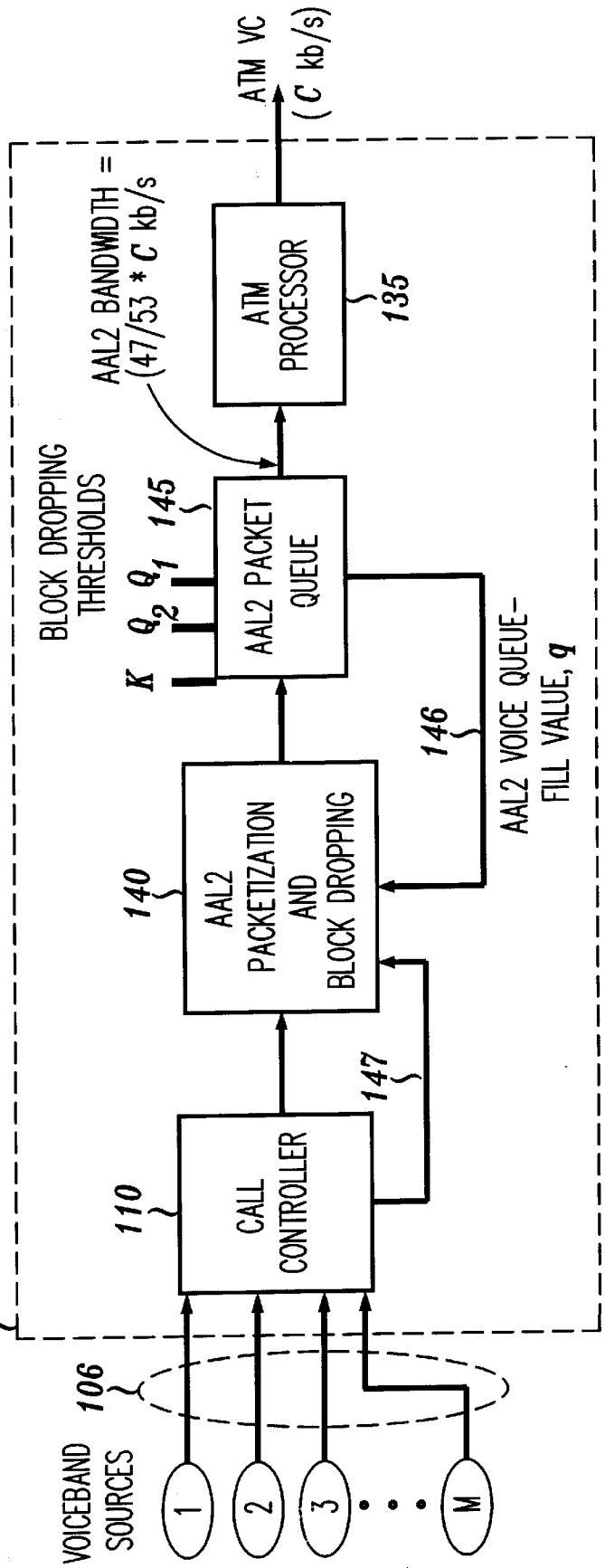
FIG. 6 shows an alternative view of the portion of the communications system shown in FIG. 4.

In order to better illustrate the principles of the invention, an alternative view of the portion of the communications system shown in FIG. 4 is shown in FIG. 6. In this representation, facility 106 is shown as conveying m voice-band calls to call controller 110, as described above. AAL2/SSCS processor 130 comprises AAL2 packetization and block dropping element 140, and AAL2 queue 145 (described below). As can be observed, an AAL2/SSCS packet system multiplexes a variety of traffic types onto an outgoing ATM virtual circuit (VC) pipe, or facility, which has a fixed bandwidth C kb/s. This fixed bandwidth is determined a priori or negotiated with a distant ATM endpoint, as known in the art.

As noted earlier, as new calls are placed from PBX 105 to call controller 110, these new calls must either be accepted into the associated VC or blocked. Therefore, and in accordance with the invention, call processor 125 implements a call admission strategy that is dynamically performed as a function of call type. In particular, this approach takes into account different bandwidth needs for different call types, and also takes advantage of statistical multiplexing of voice calls. It is assumed that silence elimination is applied to voice calls, i.e., no packets are transmitted during silence periods.

It should be noted that the following assumptions have been made for the below-described computations concerning capacity and effective bandwidth. Effective bandwidth, $V_n$, is the minimum bandwidth that is required per voice call when n voice calls are statistically multiplexed while meeting performance objectives such as listed below. Statistical multiplexing gain is defined as the ratio of peak bandwidth of a voice call to its effective bandwidth, $V_n$.

Example performance objectives for AAL2/SSCS voice multiplexing with bit dropping:

(1) Average packet queuing delay $\leq 5$ ms,
(2) Tail of packet queuing delay (mean plus 5 * std dev) $\leq 15$ ms,
(3) Mean bits per sample $\geq 3.8$, and
(4) Packet loss (buffer overflow) probability $\leq 10^{-4}$.

Example performance objectives for AAL2/SSCS voice multiplexing without bit dropping:

(1) Average packet queuing delay $\leq 5$ ms,
(2) Tail of packet queuing delay (mean plus 5 * std dev) $\leq 10$ ms, and
(3) Packet loss (buffer overflow) probability $\leq 10^{-3}$.

In some instances of system implementation, bit dropping may be disabled or not at all included as a feature. Bit dropping may be disabled, for example, when the traffic is dominated by data and fax, and only a small fraction of the traffic is voice. Although bit dropping is assumed in the description below, it should be noted that this system can also operate without bit dropping. Statistical multiplexing of voice may be done in either case (i.e., with bit dropping or without). When voice is statistically multiplexed, temporary traffic overloads occur which result in excessive voice packet delay or loss. However, bit dropping mitigates the effects of these overloads by allowing less significant bits to be selectively dropped during the temporary overload periods (described in more detail later). Bit dropping results in smaller packet delays, and hence allows for better statistical multiplexing gain as compared to the case of no bit dropping (for a given ATM VC bandwidth). This comparison is well illustrated by the example numerical data plotted in FIG. 7.

Figure 7:
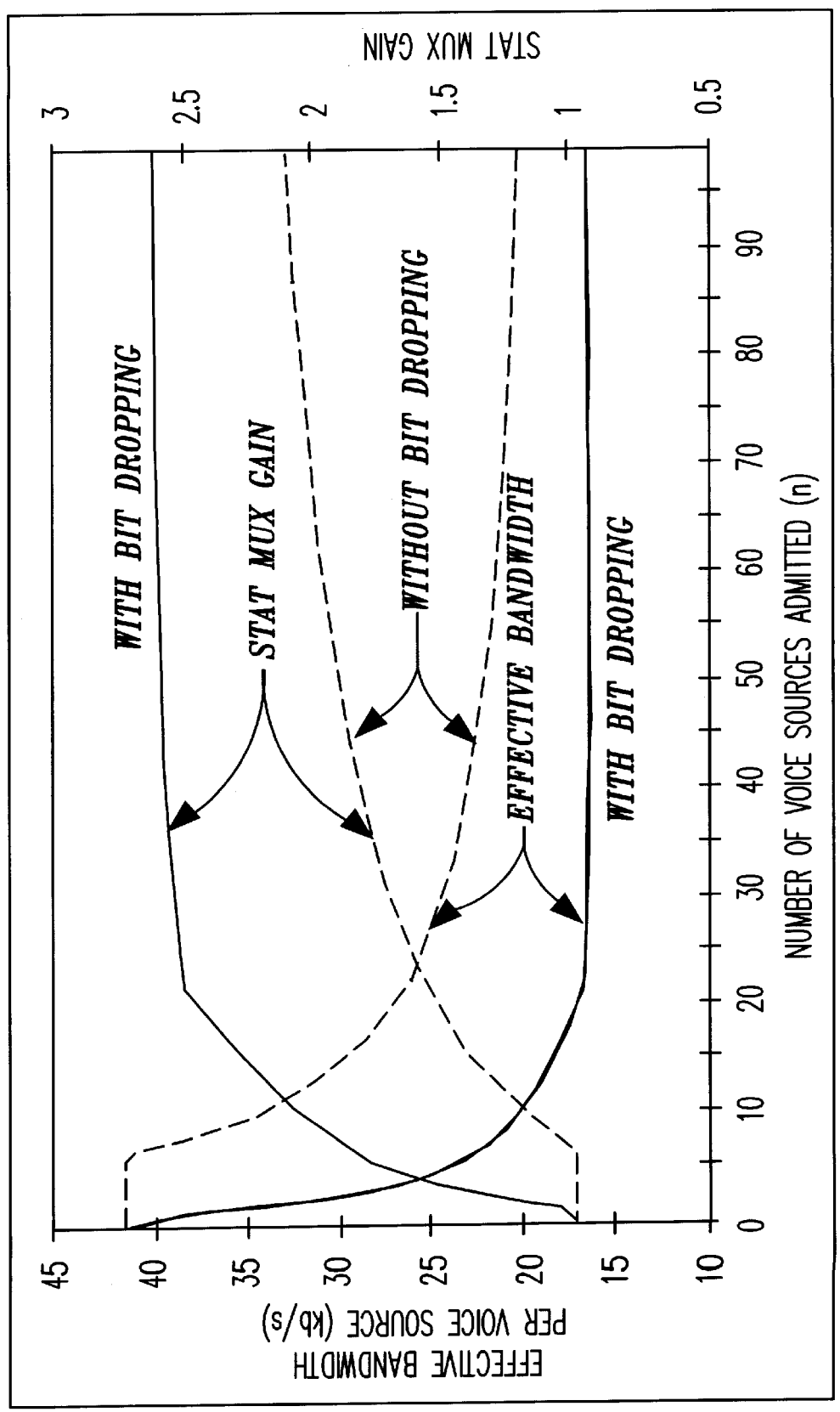
FIG. 7 shows an illustrative graph of effective bandwidth and statistical multiplexing gain.

For reference purposes only, FIG. 7 shows a graph of illustrative simulation results for effective bandwidth per voice source (in kb/s) (left ordinate axis) versus number of admitted voice sources; and statistical multiplexing gain (stat mux gain) (right ordinate axis) versus the number of admitted voice sources. (The details concerning statistical multiplexing gain are known in the art and will not be described herein. Since voice-band data and fax have fixed bandwidths, these signals do not get the benefits of statistical multiplexing.)

The following system and state data definitions are made for the communications system of FIGS. 4 and 6 (these parameters/variables are presumed to be available to the elements of call processor 125, e.g., stored in memory):

n=Number of voice (embedded ADPCM) calls in progress;

$V_n$=Effective bandwidth required to admit a new voice call, with n new calls present (see FIG. 7);

C=Total bandwidth available for the VC;

G=Total bandwidth currently allocated to data and fax calls;

$B_i$=Fixed bandwidth required to admit a non-voice call of type i, for i=1,2, . . . ,k;

W=Spare bandwidth, (initially, W=C); and $B_0$=Initial bandwidth for call admission=64*43/40*53/47=77.6 kb/s;

$C_V$=Bandwidth available for voice=C−G;

$Q_1$=First block dropping threshold for voice;

$Q_2$=Second block dropping threshold for voice; and

K=AAL2 packet buffer limit.

It should be noted that in the definition for $B_0$, the ratio of 43/40 represents the added AAL2 overhead, and the ratio of 53/47 represents the added ATM cell overhead.

Figure 8:
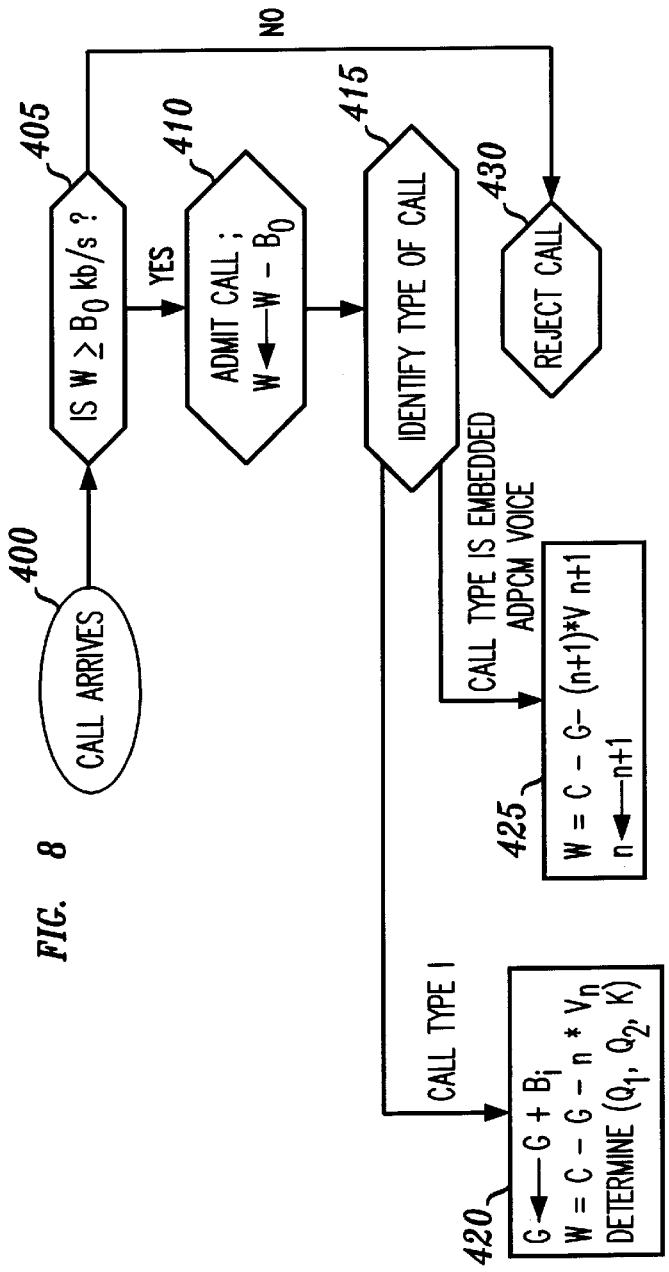
FIG. 8 shows a flow chart of a call admission procedure embodying the principles of the invention.

Reference should now be made to FIG. 8 which illustrates a call admission control algorithm in accordance with the principles of the invention for use in call controller 110 of call processor 125 of FIGS. 4 and 6. (It is presumed that call processor 125 is suitably programmed to carry out the below-described algorithm using conventional programming techniques, which, as such, will not be described herein.)

In step 400, a call arrives via facility 106 from PBX 105 (shown in FIG. 4). In step 405, a check is made if the spare bandwidth, W, is greater than the initial bandwidth, $B_0$, for call admission. If the spare bandwidth, W, in not greater than $B_0$, then the call is rejected in step 430. Otherwise, the call is admitted in step 410 and the spare bandwidth, W, is updated to: W=W−B$_0$. It should be noted, and as described below, that the spare bandwidth W is temporarily reduced by B$_0$ because it takes up to 50 ms to classify a call. As such, in this example a call is admitted if at least B$_0$ bandwidth is initially available.

In step 415, identification of call type is performed. Steps 420 and 425 update the value of the spare bandwidth as a function of the identified call type.

If the call is type "0," i.e., voice, then, in step 425, the value of the spare bandwidth, W, is updated to be equal to the capacity of the ATM VC reduced by a) the bandwidth, G, assigned to data and fax, and b) the bandwidth, (n+1) V$_{n+1}$, now assigned to voice calls. At this point, the number of voice calls admitted, n, is increased, n←n+1.

If the call type is other than "0," e.g., fax or data, then, in step 420, the value of the bandwidth, G, assigned to data and fax is increased, G←G+B$_i$, where B$_i$ is the bandwidth of the identified call type, as shown in the table of FIG. 5. In addition, the value of the spare bandwidth, W, is updated to be equal to the capacity of the line reduced by a) the bandwidth, G, assigned to data and fax, and b) the bandwidth, nV$_n$, assigned to voice calls. In addition, in step 425, the block dropping thresholds (Q$_1$, Q$_2$, K) are varied in accordance with the new bandwidth values since the bandwidth available for voice C$_V$ has now changed (described below).

At the end of steps, 420, 425, and 430, call controller 110 waits for the next call.

Figure 9:
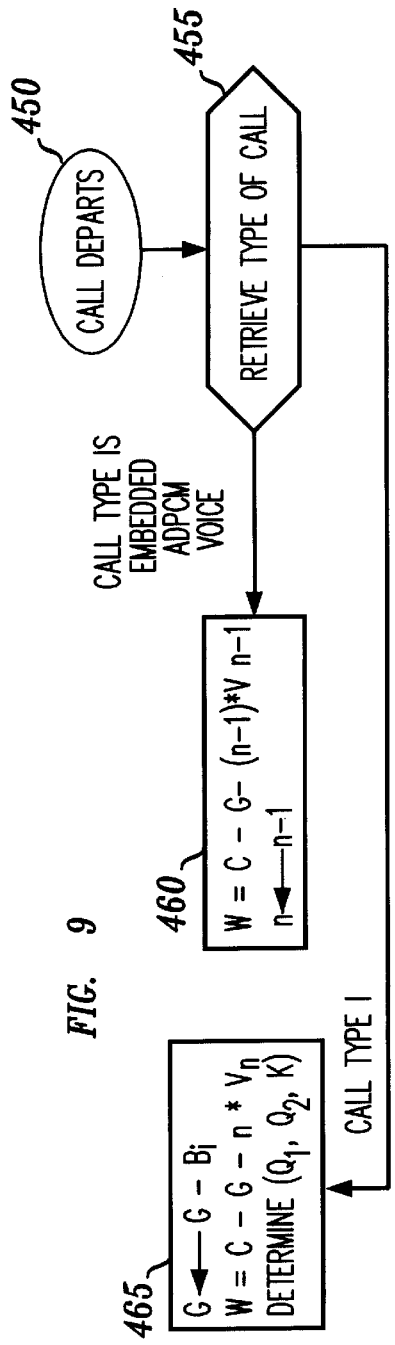
FIG. 9 shows a flow chart of a call departure procedure for use with the call admission procedure of FIG. 8.

Turning now to FIG. 9, a method is shown, in accordance with the principles of the invention, for updating the above-described system and state parameters when a call departs the system shown in FIGS. 4 and 6. This method is illustratively performed by call controller 110 of FIGS. 4 and 6.

When a call departs the system, in step 450, the call type (previously identified in step 415 of FIG. 8) is retrieved in step 455. If the call is type "0," i.e., voice, then, in step 460, the value of the spare bandwidth, W, is updated to be equal to the capacity of the line reduced by a) the bandwidth, G, assigned to data and fax, and b) the bandwidth, (n−1)V$_{n-1}$, now assigned to voice calls. At this point, the number of voice calls admitted, n, is reduced, n←n−1.

If the call type is other than "0," e.g., fax or data, then, in step 465, the value of the bandwidth, G, assigned to data and fax is reduced to: G←G−B$_i$, where B$_i$ is the bandwidth of the identified call type, as shown in the table of FIG. 5. In addition, the value of the spare bandwidth, W, is updated to be equal to the capacity of the line reduced by a) the bandwidth, G, assigned to data and fax, and b) the bandwidth, nV$_n$, assigned to voice calls. In addition, in step 465, the block dropping thresholds (Q$_1$, Q$_2$, K) are varied in accordance with the new bandwidth values since the bandwidth available for voice C$_V$ has now changed (described below).

As noted in steps 425 and 465 of FIG. 9, and in addition to the above described dynamic call admission strategy, queue, or buffer, parameters are also varied as a function of bandwidth. Returning to FIG. 6, AAL2 packet queue 145 has a fixed size K (in bytes). AAL2 packet queue 145 provides a current voice packet fill value, q, to AAL2 packetization and block dropping element 140 via signal 146. (Although shown as markers on AAL2 packet queue 145, the values for K, Q$_1$ and Q$_2$ are stored in AAL2 packetization and block dropping element 140.) This current fill value, q, represents the number of voice packets queued for transmission. As known in the art, traffic bursts (i.e., the arrival of many voice packets in a short time) may cause the number of AAL2 voice packets queued up for transmission, q, to increase. When the value of q reaches some predefined thresholds, block dropping occurs (also known in the art as bit dropping).

FIG. 10 shows an illustrative organization of an AAL2 voice packet. Each AAL2 voice packet comprises 23 bytes formatted into a header portion (3 bytes) and four blocks, each block 5 bytes long. In accordance with G0.727, blocks # 2 and # 3 represent the more significant bits, while blocks # 0 and # 1 represent the less significant bits. Block # 3 and block # 2 are never dropped (except when packet is dropped due to buffer overflow), while block # 0 or Blocks # 0 and # 1 may be dropped during traffic congestion. An illustrative table indicating these effects is shown in FIG. 11.

The parameters Q$_1$, Q$_2$, and K are block-dropping thresholds specified in terms of number of AAL2 voice packets. As noted above, the queue-fill, q, is the number of AAL2 voice packets waiting in the buffer 145 for transmission (see FIG. 6). In the prior art, the values of Q$_1$, Q$_2$, and K are predetermined and fixed. The table of FIG. 11 illustrates that for particular ranges of the value of q, different forms of congestion relief occur. For values of q≦Q$_1$, no AAL2 voice bits or packets are dropped. For values of q within the range of Q$_1$≦q≦Q$_2$, bit dropping occurs, and block 0 of each incoming AAL2 voice packet (at the input to queue 145 in FIG. 6) is dropped. For values of q within the range of Q$_2$<q≦K−1, bit dropping occurs, and blocks 0 and 1 of each incoming AAL2 voice packet are dropped. Finally, for values of q>K, whole voice packets are dropped. Referring back to FIG. 6, AAL2 packetization and block dropping element 140 performs the bit dropping or packet dropping at the input to AAL packet queue 145. This is referred to herein as "input block dropping."

In accordance with a feature of the invention, the following algorithm dynamically varies the values for the parameters Q$_1$, Q$_2$, and K. It is assumed herein that the AAL2 voice packets (amenable to block dropping) are queued together with packets of other calls, e.g., fax and data. However, the value of the queue-fill, q, used in the block dropping algorithm pertains only to the number of AAL2 (block-droppable) voice packets waiting in the buffer for transmission. (It is assumed that the AAL2 packets are distinguished on the basis of their CID value, as is known in the art. In particular, some CID values are associated with voice and other CID values are associated with non-voice. This association is provided by call controller 110.)

As defined above, let C$_V$ be the bandwidth available for block-droppable voice. If, for example, there are no fax and data calls present in the system, and the traffic is all voice (block-droppable), then C$_V$ is equal to the ATM VC bandwidth of C kb/s. Otherwise, C$_V$=C−G, where G represents bandwidth (in kb/s) assigned to existing fax and data calls.

An illustrative algorithm for dynamically varying the parameters Q$_1$, Q$_2$, and K as a function of available voice bandwidth, C$_V$, is shown in FIG. 12 for use in call controller 110 of FIGS. 4 and 6. (In this example, the thresholds obtained by this algorithm ensure that the packet delays corresponding to the buffer fill values of Q$_1$, Q$_2$, and K, are approximately 5 ms, 10 ms, and 15 ms, respectively (or lower for the range of the link bandwidth values). In step 300, call controller 110 determines the available voice bandwidth, C$_V$. The values for the block-dropping thresholds are a function of the available voice bandwidth, C$_V$, determined in step 300 (e.g., see steps 310, 320, 330, 340 and 350). If the value of C$_V$ is less than 333 kb/s, then the values for the block-dropping thresholds are Q$_1$=10, Q$_2$=20, and K=30 (steps 310 and 330). If the value of C$_V$ is more than 1000 kb/s, then the values for the block-dropping thresholds are $Q_1=30$, $Q_2=60$, and $K=90$ (steps 320 and 350). Otherwise, the values for $Q_1$, $Q_2$, and K are determined by the equations shown in step 340. (The symbols ⌈ ⌉ are representative of taking the "ceiling of" the value, i.e., the next highest integer value.) The new values of $Q_1$, $Q_2$, and K are provided to AAL2 packetization and block dropping element 140 via signal 147 (see FIG. 6).

The above examples for bit dropping and packet dropping were with respect to "input block dropping." However, the above-described algorithm can also be used with other architectures, e.g., with "output block dropping." An alternative architecture using "output block dropping" is shown in call processor 600 of FIG. 13. (It should be noted that voice quality effects as well as packet delay performance are known to be practically indifferent to input or output block dropping (while the VC bandwidth, C, and $Q_1$, $Q_2$, K values are the same).) In call processor 600, since block dropping is performed after AAL2 packetization, element 160 not only performs block dropping as described above, but also updates the AAL2 length field appropriately.

Figure 14:
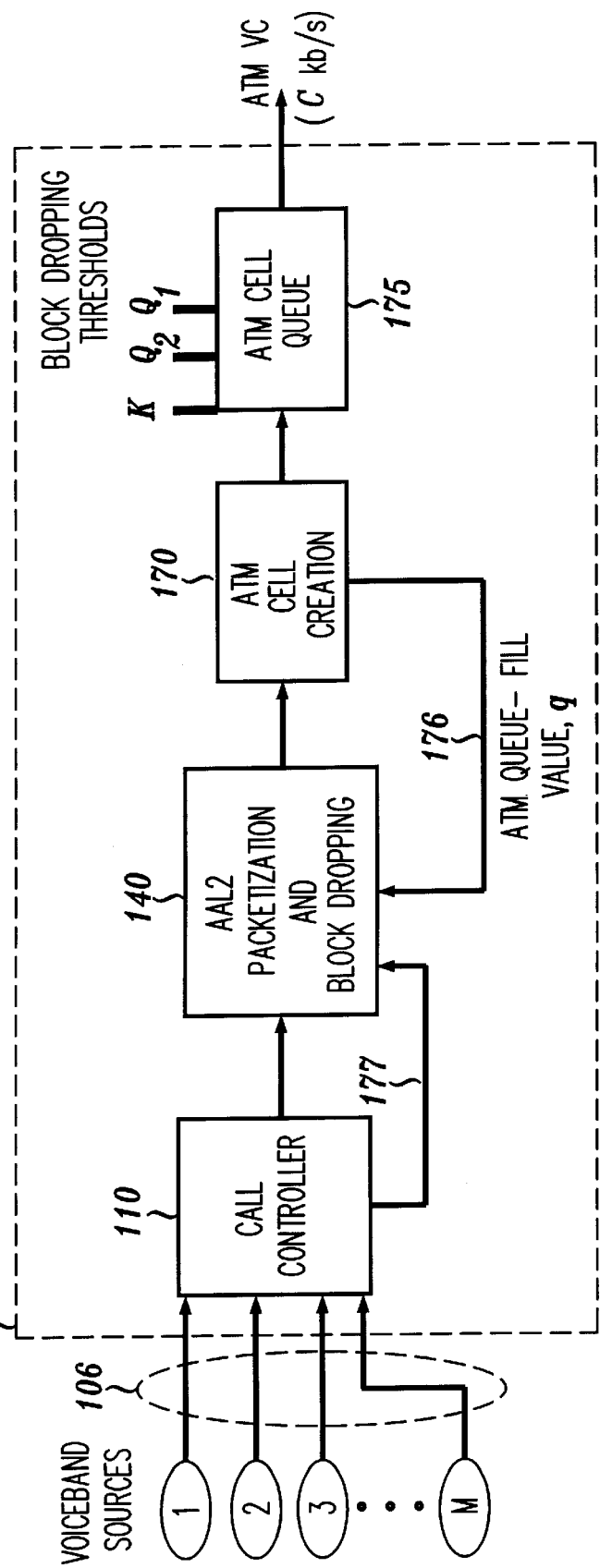
FIG. 14 shows another embodiment of a packet communications system embodying the principles of the invention.

Another alternative architecture is shown in FIG. 14. In this figure, "input bit dropping" is performed in a similar manner as described above. However, the queuing is performed by the ATM processor, which comprises ATM Cell Creation element 170 and ATM Cell Queue 175 of call processor 700. The above-described algorithm for dynamically varying the values for the parameters $Q_1$, $Q_2$, and K, is suitably modified to take into account the number of ATM cells (which convey voice) queued for transmission as opposed to the number of AAL2 voice packets queued for transmission.

As described above, a packet voice system utilizes a call admission algorithm that dynamically handles both statistically multiplexed calls and other call types such as fax and voice-band data of various modem speeds.

The foregoing merely illustrates the principles of the invention and it will thus be appreciated that those skilled in the art will be able to devise numerous alternative arrangements which, although not explicitly described herein, embody the principles of the invention and are within its spirit and scope. For example, the call admission control algorithm of the inventive concept is also applicable to non-packetized systems such as digital circuit multiplication equipment (DCME) well known in the art. The algorithm is generally applicable independent of the modulation schemes used which may include discrete multi-tone (DMT), quadrature phase shift keying (QPSK), or quadrature amplitude modulation (QAM), etc. Further, the invention is also applicable to TDMA as well as CDMA wireless systems.

What is claimed:

1. A method for use in communications, the method comprising the steps of:
   receiving an incoming call, the incoming call representing one of a plurality of call types comprising voice calls, and non-voice calls that can use a facility;
   admitting the incoming call for using the facility as a function of the call type of the incoming call;
   determining an amount of bandwidth available for voice as a function of a number of non-voice admitted calls;
   setting a value of at-least-one parameter as a function of the determined amount of bandwidth, wherein the at-least-one parameter is associated with a buffer for holding voice call traffic; and
   performing block dropping on the held voice call traffic as a function of the set value of the at-least-one parameter value.

2. A method for use in a packet communications system, which provides access to at least one virtual circuit, the method comprising the steps of:
   determining a call type of an incoming call; each call type having an associated bandwidth;
   admitting the incoming call to use the virtual circuit if the associated bandwidth of the incoming call is not greater than a spare bandwidth that is associated with the virtual circuit;
   determining an amount of bandwidth available for voice as a function of a number of non-voice admitted calls on the virtual circuit;
   setting a value of at-least-one parameter as a function of the determined amount of bandwidth, wherein the at-least-one parameter is associated with a buffer for holding voice call traffic for transmission over the virtual circuit; and
   performing block dropping on the held voice call traffic as a function of the set value of the at-least-one parameter value.

3. A method for use in a packet communications system, which provides access to at least one virtual circuit, the method comprising the steps of:
   determining a call type of an incoming call; each call type having an associated bandwidth;
   admitting the incoming call to use the virtual circuit if the associated bandwidth of the incoming call is not greater than a spare bandwidth that is associated with the virtual circuit;
   responsive to the admitted call, providing a stream of ATM Adaptation Layer 2 (AAL2) packets for conveying information associated with the admitted call;
   responsive to the stream of AAL2 packets, providing a respective stream of ATM cells for transmission over the virtual circuit;
   determining an amount of bandwidth available for voice as a function of a number of non-voice admitted calls on the virtual circuit;
   setting a value of at-least-one parameter as a function of the determined amount of bandwidth, wherein the at-least-one parameter is associated with a buffer for holding AAL2 voice call traffic for transmission over the virtual circuit; and
   performing block dropping on the held AAL2 packets as a function of the set value of the at-least-one parameter value.

4. A method for use in a packet communications system, which provides access to at least one virtual circuit, the method comprising the steps of:
   determining a call type of an incoming call; each call type having an associated bandwidth;
   admitting the incoming call to use the virtual circuit if the associated bandwidth of the incoming call is not greater than a spare bandwidth that is associated with the virtual circuit;
   responsive to the admitted call, providing a stream of ATM Adaptation Layer 2 (AAL2) packets for conveying information associated with the admitted call;
   responsive to the stream of AAL2 packets, providing a respective stream of ATM cells for transmission over the virtual circuit;
   determining an amount of bandwidth available for voice as a function of a number of non-voice admitted calls on the virtual circuit;

setting a value of at-least-one parameter as a function of the determined amount of bandwidth, wherein the at-least-one parameter is associated with a buffer for holding ATM cells conveying AAL2 voice call traffic for transmission over the virtual circuit; and performing block dropping on the held ATM cells as a function of the set value of the at-least-one parameter value.

5. Apparatus for use in communications, the apparatus comprising:

a call processor for receiving an incoming call, the incoming call representing one of a plurality of call types comprising voice calls, and non-voice calls that can use a facility;

wherein the call processor admits the incoming call for using the facility as a function of the call type of the incoming call and wherein the call processor (a) determines an amount of bandwidth available for voice as a function of a number of non-voice admitted calls; (b) sets a value of at-least-one parameter as a function of the determined amount of bandwidth, wherein the at-least-one parameter is associated with a buffer for holding voice call traffic, and (c) performs block dropping on the held voice call traffic as a function of the set value of the at-least-one parameter value.

6. The apparatus of claim 5 wherein the call processor (a) identifies the call type of the incoming call, (b) associates with each call type a call bandwidth; and (b) admits the incoming call if the call bandwidth of the incoming call is not greater than a spare bandwidth that is associated with the facility for use by the incoming call.

7. The apparatus of claim 6 wherein the call processor blocks the incoming call if the incoming call is not admitted.

8. The apparatus of claim 6 wherein the call processor reduces the spare bandwidth by an amount equal to the call bandwidth of the admitted incoming call.

9. The apparatus of claim 6 wherein the call processor increases the spare bandwidth by an amount equal to the call bandwidth of the admitted incoming call when the admitted incoming call departs.

10. Apparatus for use in a packet communications system, which provides access to at least one virtual circuit, the apparatus comprising:

a call classifier for determining a call type of an incoming call; each call type having an associated bandwidth and for admitting the incoming call to use the virtual circuit if the associated bandwidth of the incoming call is not greater than a spare bandwidth that is associated with the virtual circuit;

a processor responsive to the admitted call for providing a stream of ATM Adaptation Layer 2 (AAL2) packets for conveying information associated with the admitted call; and a processor responsive to the stream of AAL2 packets for providing a respective stream of ATM cells for transmission over the virtual circuit wherein the call classifier further (a) determines an amount of bandwidth available for voice as a function of a number of non-voice admitted calls on the virtual circuit; and (b) sets a value of at-least-one parameter as a function of the determined amount of bandwidth, wherein the at-least-one parameter is associated with a buffer for holding voice call traffic for transmission over the virtual circuit; and wherein the processor for providing the stream of AAL2 packets performs block dropping on the held voice call traffic as a function of the set value of the at-least-one parameter value.

11. Apparatus for use in a packet communications system, which provides access to at least one virtual circuit, the apparatus comprising:

a call classifier for determining a call type of an incoming call; each call type having an associated bandwidth and for admitting the incoming call to use the virtual circuit if the associated bandwidth of the incoming call is not greater than a spare bandwidth that is associated with the virtual circuit;

a processor responsive to the admitted call for providing a stream of ATM Adaptation Layer 2 (AAL2) packets for conveying information associated with the admitted call; and a processor responsive to the stream of AAL2 packets for providing a respective stream of ATM cells for transmission over the virtual circuit wherein the call classifier further (a) determines an amount of bandwidth available for voice as a function of a number of non-voice admitted calls on the virtual circuit; and (b) sets a value of at-least-one parameter as a function of the determined amount of bandwidth, wherein the at-least-one parameter is associated with a buffer for holding voice call traffic for transmission over the virtual circuit; and wherein the processor for providing the stream of ATM cells performs block dropping on the held voice call traffic as a function of the set value of the at-least-one parameter value.

* * * * *